United States Patent
Loebig et al.

(10) Patent No.: US 9,410,478 B2
(45) Date of Patent: Aug. 9, 2016

(54) INTERCOOLED GAS TURBINE WITH CLOSED COMBINED POWER CYCLE

(71) Applicant: Rolls-Royce North American Technologies, Inc., Indianapolis, IN (US)

(72) Inventors: James C. Loebig, Greenwood, IN (US); Robert Manning, Lebanon, IN (US)

(73) Assignee: Rolls-Royce North American Technologies, Inc., Indianapolis, IN (US)

( * ) Notice: Subject to any disclaimer, the term of this patent is extended or adjusted under 35 U.S.C. 154(b) by 260 days.

(21) Appl. No.: 14/134,427

(22) Filed: Dec. 19, 2013

(65) Prior Publication Data

US 2014/0352317 A1    Dec. 4, 2014

Related U.S. Application Data

(60) Provisional application No. 61/786,178, filed on Mar. 14, 2013.

(51) Int. Cl.
| | |
|---|---|
| *F02C 7/143* | (2006.01) |
| *F02C 3/04* | (2006.01) |
| *F02C 7/12* | (2006.01) |
| *F02K 3/06* | (2006.01) |

(52) U.S. Cl.
CPC ... *F02C 3/04* (2013.01); *F02C 7/12* (2013.01); *F02C 7/143* (2013.01); *F02K 3/06* (2013.01); *F05D 2210/14* (2013.01); *F05D 2220/62* (2013.01); *F05D 2220/72* (2013.01); *F05D 2220/76* (2013.01); *Y02T 50/675* (2013.01); *Y10T 29/49229* (2015.01)

(58) Field of Classification Search
CPC ........................................................ F02C 7/143
USPC ................................................................ 60/728
See application file for complete search history.

(56) References Cited

U.S. PATENT DOCUMENTS

| | | |
|---|---|---|
| 4,896,499 A | 1/1990 | Rice |
| 5,313,782 A | 5/1994 | Frutschi et al. |
| 5,555,738 A | 9/1996 | DeVault |
| 6,050,082 A | 4/2000 | Leonard et al. |
| 6,430,931 B1 | 8/2002 | Horner |
| 7,069,726 B2 | 7/2006 | Frutschi |

(Continued)

FOREIGN PATENT DOCUMENTS

| | | |
|---|---|---|
| EP | 2410153 A2 | 1/2012 |
| WO | WO-2012057848 | 5/2012 |
| WO | WO-2013151028 A1 | 10/2013 |

OTHER PUBLICATIONS

International search report PCT/US2013/072138 mailed on Nov. 10, 2014.

*Primary Examiner* — Gerald L Sung
*Assistant Examiner* — Scott Walthour
(74) *Attorney, Agent, or Firm* — Fishman Stewart PLLC

(57) ABSTRACT

A turbine engine includes a fan that provides an air flow to the turbine engine as compressor intake air and as compressor bypass air, a first stage compressor positioned to receive the compressor intake air and output a first stage compressed air, and a boiler positioned to cool the first stage compressed air using a fluid. A second stage compressor is positioned to receive the cooled first stage compressed air. A pump is configured to pump the fluid as a liquid into the boiler, extract energy from the first stage compressed air, and cause the cooling of the first stage compressed air.

19 Claims, 3 Drawing Sheets

(56) References Cited

U.S. PATENT DOCUMENTS

| | | |
|---|---|---|
| 7,284,377 B2 | 10/2007 | Joshi et al. |
| 7,550,218 B2 * | 6/2009 | Hoffjann ............... B01D 53/02 |
| | | 429/440 |
| 8,220,268 B2 | 7/2012 | Callas |
| 2005/0235625 A1 | 10/2005 | Gericke et al. |
| 2008/0092548 A1 * | 4/2008 | Morford ................. F02K 1/06 |
| | | 60/771 |
| 2008/0230651 A1 * | 9/2008 | Porte ..................... B64D 13/06 |
| | | 244/118.5 |
| 2010/0083632 A1 * | 4/2010 | Foster ................... B64D 27/16 |
| | | 60/39.181 |
| 2011/0094231 A1 | 4/2011 | Freund |
| 2012/0144838 A1 | 6/2012 | John et al. |
| 2012/0159923 A1 | 6/2012 | Freund et al. |
| 2012/0216502 A1 | 8/2012 | Freund et al. |
| 2013/0239542 A1 | 9/2013 | Dasgupta et al. |

* cited by examiner

INTERCOOLED GAS TURBINE WITH CLOSED COMBINED POWER CYCLE

CROSS-REFERENCE TO RELATED APPLICATIONS

This application claims priority to U.S. Provisional Patent Application No. 61/786,178 filed Mar. 14, 2013, the contents of which are hereby incorporated in their entirety.

GOVERNMENT RIGHTS

This disclosure was made with government support under FA8650-09-D-2921-0009 awarded by the United States Air Force. The government has certain rights in the disclosure.

FIELD OF TECHNOLOGY

An improved method of operating a gas turbine is disclosed and more particularly, an improved method of intercooling the compressors and obtaining power therefrom.

BACKGROUND

It is desirable to improve gas turbine performance and improve overall specific fuel consumption (SFC) in a gas turbine. In a typical gas turbine, air is compressed through one or more compressors before combustion. The combustion products are expanded, and power is extracted therefrom, via one or more turbine stages. The combustion products are expelled at generally high temperature.

Generally during the compression process, the incoming air experiences significant heating during its reduction in specific volume, to the extent that material temperature limits may be reached. The overall pressure ratio (OPR) may be limited by the temperature limitations of the compressor itself. Thus, in order to improve the OPR and thereby the overall engine performance and SFC, known systems include providing one or more intercoolers that cool the compressed air between compressor stages. That is, by intercooling the compressed incoming air between stages, the air may be caused to achieve yet higher OPR while staying within the temperature limits of the compressor materials.

Known systems for intercooling include using air as the coolant between compressor stages. That is, air passing from a first stage compressor may pass through an air-air heat exchanger (i.e., an intercooler), resulting in cooled/compressed air that is passed to a second stage compressor where the compressed air is compressed to a yet higher pressure. Without the intercooler, compressed air exiting the second stage compressor may be excessive and may exceed acceptable temperature limits.

However, using air in an intercooler presents a number of challenges in gas turbine design. First, because of the relatively low thermal carrying capacity of air, adequate ducting should be provided such that enough mass flow is achieved to extract the energy from the compressed air after the first stage of compression, and reduce the compressed air to its inlet temperature to the second compression stage. Also, because the heat transfer fluid in the intercooler is air, separate air handling units are also provided that move the air in a cross or counter flow direction. Ducting and fans that move the air through the intercooler tend to be large, complex, and costly. An aircraft engine is in an environment that is sensitive to the amount of mass (i.e., weight in an aircraft application) and space is a premium.

In addition, heat removed between compression stages in an intercooler is typically ejected as waste heat and no work is extracted therefrom. That is, hot air from the intercooler is a low grade energy which presents little opportunity for work extraction, and it is simply ejected. Thus, in addition to providing compressor intercooling, there is also a need to reduce the spatial requirements and complexity of the turbine engine, while improving the overall SFC and energy output of the turbine engine.

BRIEF DESCRIPTION OF THE DRAWINGS

While the claims are not limited to a specific illustration, an appreciation of the various aspects is best gained through a discussion of various examples thereof. Referring now to the drawings, exemplary illustrations are shown in detail. Although the drawings represent the illustrations, the drawings are not necessarily to scale and certain features may be exaggerated to better illustrate and explain an innovative aspect of an example. Further, the exemplary illustrations described herein are not intended to be exhaustive or otherwise limiting or restricted to the precise form and configuration shown in the drawings and disclosed in the following detailed description. Exemplary illustrations are described in detail by referring to the drawings as follows:

DETAILED DESCRIPTION

An exemplary gas turbine includes a fan that provides an air flow to the turbine engine as compressor intake air and as compressor bypass air, and a first stage compressor positioned to receive the compressor intake air and output a first stage compressed air. A boiler is positioned to cool the first stage compressed air using a fluid, and a second stage compressor positioned to receive the cooled first stage compressed air. A pump is configured to pump the fluid as a liquid into the boiler, extract energy from the first stage compressed air, and cause the cooling of the first stage compressed air.

Another exemplary illustration includes providing a method of operating a turbine engine that includes providing air to the turbine engine as compressor intake air and as compressor bypass air, passing the intake air through a first stage compressor to generate first stage compressed air, and passing the first stage compressed air into a boiler. The method includes heating a coolant by passing the coolant as a liquid into the boiler to extract energy from the first stage compressed air, and passing the first stage compressed air from the boiler into a second stage compressor.

Another exemplary illustration includes a method of manufacturing a turbine engine that includes assembling a fan to provide an air flow to the turbine engine as compressor intake air and as compressor bypass air, and positioning a first stage compressor to receive the compressor intake air and output a first stage compressed air. The method includes positioning a boiler to cool the first stage compressed air using a fluid, positioning a second stage compressor to receive the cooled first stage compressed air, and configuring a pump to pump the fluid as a liquid into the boiler, extract energy from the first stage compressed air, and cause the cooling of the first stage compressed air.

Figure 1:
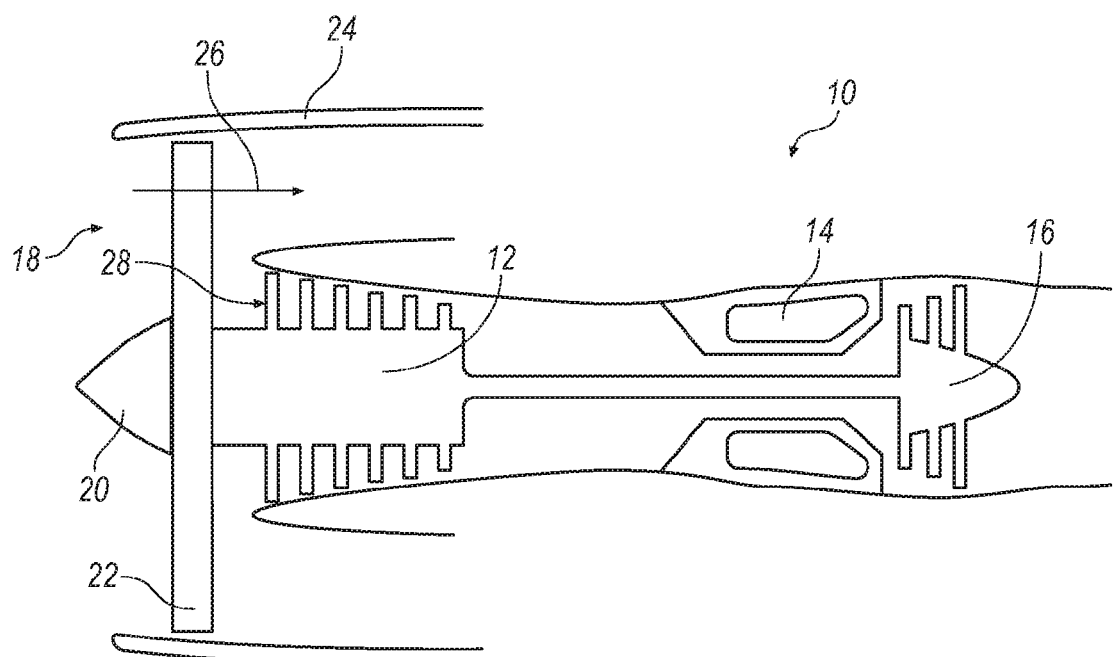
FIG. 1 is an illustration of a current state of the art gas turbine engine which may employ the improvements discussed herein.

Turning now to the drawings, FIG. 1 illustrates a schematic diagram of a gas turbine engine or machine 10 utilizing the improvements disclosed herein. The turbine machine 10 includes a compressor 12, a combustor 14 and a turbine assembly 16. A fan 18 includes a nosecone assembly 20, blade members 22 and a fan casing 24. The blade members 22 direct low pressure air to a bypass flow path 26 and to the compressor intake 28, which in turn provides airflow to compressor 12.

Figure 2:
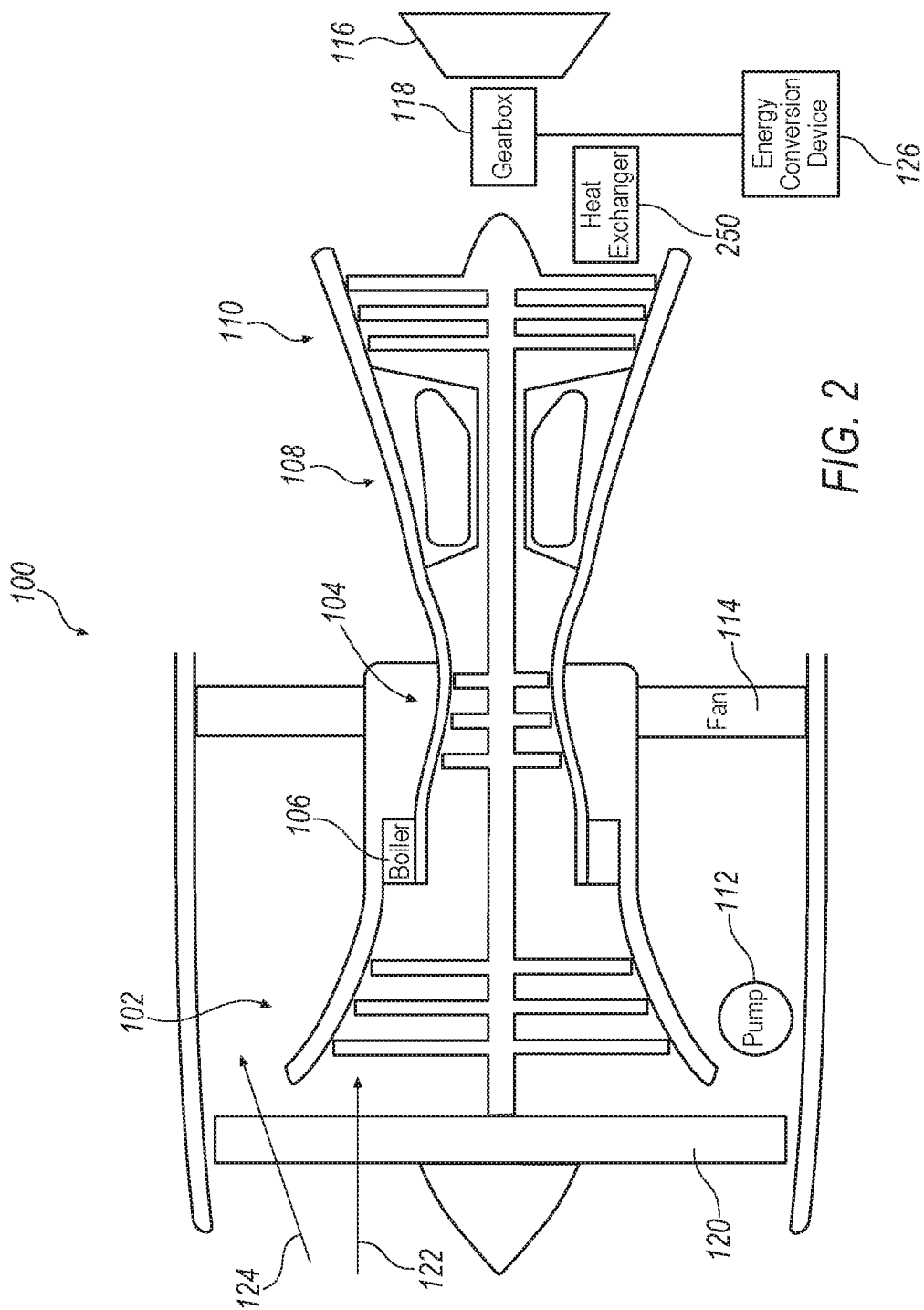
FIG. 2 is an illustration of a gas turbine engine illustrating components corresponding to the improvements discussed herein.
Figure 3:
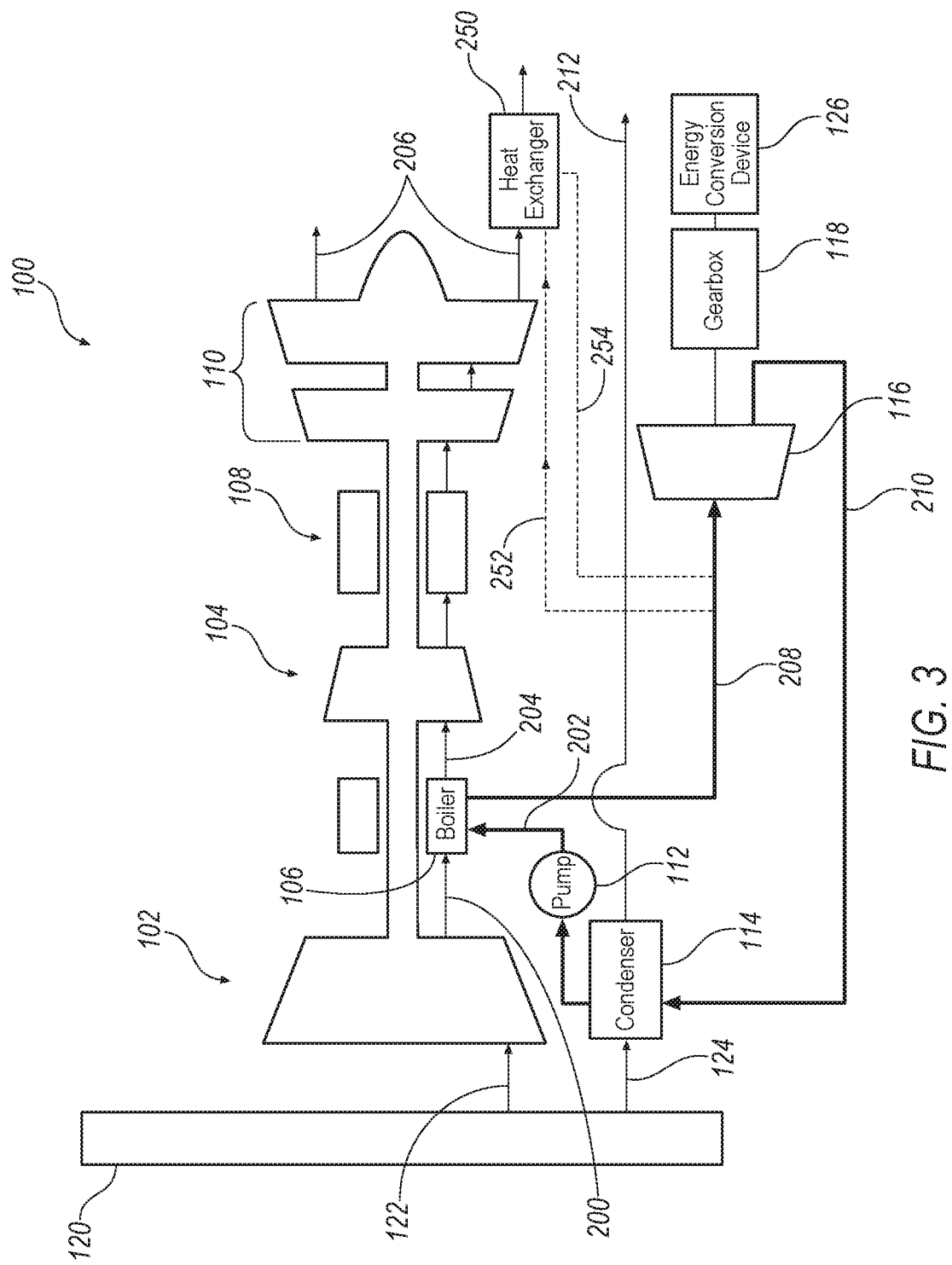
FIG. 3 is a block diagram of a gas turbine engine illustrating components corresponding to the improvements discussed herein.

FIG. 2 is an illustration of a gas turbine engine illustrating components corresponding to the improvements discussed herein, and FIG. 3 is a block diagram that corresponds thereto and illustrates interconnection of components. Turbine engine 100 includes a first stage compressor 102 and a second stage compressor 104. A boiler 106 is positioned between first stage compressor 102 and second stage compressor 104 such that air passing between compressor stages 102 and 104 passes through boiler 106. A combustor 108 is positioned aft second stage compressor 104. Turbine engine 100 includes a turbine assembly 110 that includes at least one turbine stage, but may include a high pressure (HP) turbine and a low pressure (LP) turbine (for a 2 spool design) and may also include an intermediate pressure turbine (IP) (for a 3 spool design). Turbine engine 100 includes a pump 112, a condenser 114, and a closed cycle turbine 116. Closed cycle turbine 116 is coupled to a gearbox 118. A fan 120 provides air flow to turbine engine 100 as compressor intake air 122 and as compressor bypass air 124. Gearbox 118 in one embodiment is coupled to an energy conversion device 126 which, in one embodiment is an electric motor or generator.

In operation, compressor intake air 122 passes to first stage compressor 102, past boiler 106, and to second stage compressor 104. First stage compressor 102 outputs compressed air which, due to the process of compression, is heated and output as first stage compressed air 200 to boiler 106. Boiler 106 receives a coolant as a fluid at inlet 202. First stage compressed air 200 is passed to boiler 106, cooled, and output as a cooled air 204. Cooled air 204 is passed to second stage compressor 104 where the air is further compressed, output to combustor 108, and expanded in turbine assembly 110. Combustion products are expelled as an exhaust stream 206, providing thrust for an aircraft to which turbine engine 100 is attached. As such, because of the energy extracted at boiler 106, the overall OPR of compressors 102/104 is increased over an arrangement in which energy is not extracted between first stage 102 and second stage 104.

As stated, coolant passes as a fluid at inlet 202 to boiler 106. The coolant is caused to boil in boiler 106 due to the heat from first stage compressed air 200. According to an exemplary embodiment the coolant is water or a water and ammonia mixture, or water and a mixture of another fluid that can cool the boiler. Depending on compressor design, conditions of operation, outlet temperature from first stage compressor 102, and the like, the water and ammonia mixture is caused to boil in boiler 106 and exit as a two-phase fluid. However, according to another embodiment, the water and ammonia mixture is caused to exceed its triple point and become superheated as a single-phase gas or supercritical fluid. The heated coolant, either as two-phase or single-phase fluid, is pumped or otherwise caused to move 208 to closed cycle turbine 116, where the coolant is expanded and energy is extracted therefrom. Expanded fluid exits 210 closed cycle turbine 116 and is passed to condenser 114 which is cooled by bypass air 124, and bypass air 124 is expelled 212.

As such and as described, intercooler or boiler 106 is a heat exchanger that cools the core airstream as it exits first compressor 102 and between stages 102, 104, and heats a working fluid or coolant, such as the water and ammonia mixture, by way of boiling, evaporation, and/or superheating. In one embodiment the entire core airstream 122 passes through boiler 106, but in another embodiment only a portion thereof is caused to pass through boiler 106.

In an alternate embodiment, the coolant or working fluid is caused to be further heated by extracting heat from the exhaust stream. Referring back to FIGS. 2 and 3, an additional heat exchanger 250 is positioned in exhaust stream 206, which further causes the coolant to heat and absorb yet more energy therefrom. In this embodiment, prior to entering closed cycle turbine 116, the coolant is diverted to an additional inlet line 252, where the coolant is heated and returned via additional return line 254 before passing to closed cycle turbine 116.

Thus, the working fluid is passed overall through a closed cycle that may be a Rankine cycle, a Supercritical Rankine cycle, or a Kalina cycle. The closed power cycle therefore provides the ability to generate additional power via closed turbine cycle 116, while cooling the airstream of the core turbine engine compressor between first and second stages 102, 104, which increases overall efficiency of turbine engine 100. The additional or auxiliary power can be used to generate electricity for the aircraft, supply auxiliary power requirements to components of the aircraft (i.e., to the fuel pumps, oil pumps, or hydraulic pumps, as examples), and/or augment the power output of turbine assembly 110 (in particular, augment the power of 120, fan). In one embodiment the augmented power output is via mechanical means such as a shaft. Thus, in one embodiment the auxiliary power includes electrical energy for use within a human compartment of the aircraft. In another embodiment the electrical energy is for powering a component of the aircraft. In yet another embodiment the auxiliary power provides electrical energy to augment power extracted from the turbine assembly.

Condenser 114 cools the coolant, which condenses and supercools the coolant to the liquid state prior to entering pump 112. Heat from the coolant or working fluid is transferred to bypass stream 124, increasing its temperature and increasing the thrust of bypass stream 124. When a portion of bypass stream 124 is passed through condenser 114, the engine architecture may create an additional stream (not shown) specifically for the cooling flow (e.g., core stream, bypass stream with condenser, and bypass stream without condenser). Pump 112 takes low pressure coolant from the condenser 114 exit and pumps it to relatively higher pressure before the fluid is piped to boiler 106. In this embodiment the pump is the primary means of setting the system pressure for flowing coolant.

The disclosed intercooled system with closed power cycle offers several advantages over traditional air to air intercooled gas turbine cycles. Air to air intercooled cycles do not offer to produce additional work from heat drawn out of the core stream. Also, the use of an intermediate fluid to exchange heat between the core stream and the bypass stream allows for easier packaging of the intercooler system, and a lighter weight intercooler system relative to air to air intercooler systems. Typical air-to-air intercoolers include ducting of the core stream out of the normal core flowpath and into the bypass duct heat exchanger, and then the cooled core stream is ducted back into the core flowpath. Additionally, the work produced reduces the amount of heat required to be passed to the bypass duct. Also, a 2 phase system includes an increased density of the working fluid in various portions of the cycle, enabling a smaller and more efficient system due at least to: (a) smaller ducts/pipes; (b) less work to compress the working fluid; and (c) higher heat transfer coefficients on the working fluid side. Also using a working fluid with a high Cp or latent heat (i.e. a liquid) enables smaller heat exchangers since the working fluid passages in the heat exchanger are much smaller than those of the air side.

It will be appreciated that the aforementioned method and devices may be modified to have some components and steps removed, or may have additional components and steps added, all of which are deemed to be within the spirit of the present disclosure. Even though the present disclosure has been described in detail with reference to specific embodiments, it will be appreciated that the various modifications and changes can be made to these embodiments without departing from the scope of the present disclosure as set forth in the claims. The specification and the drawings are to be regarded as an illustrative thought instead of merely restrictive thought.

What is claimed is:

1. A method of operating a turbine engine comprising:
   providing air to the turbine engine as compressor intake air and as compressor bypass air;
   passing the compressor intake air through a first stage compressor to generate first stage compressed air;
   passing the first stage compressed air into a boiler;
   heating a coolant by passing the coolant as a liquid into the boiler to extract energy from the first stage compressed air; and
   passing the first stage compressed air from the boiler into a second stage compressor;
   pumping the coolant through the boiler to a heat exchanger that is heated from an exhaust stream of the turbine engine, the coolant flowing from the heat exchanger to a closed cycle turbine to cause the closed cycle turbine to rotate; and
   extracting energy from the rotating closed cycle turbine as auxiliary energy.

2. The method as claimed in claim 1, further comprising pumping the coolant through the boiler to the closed cycle turbine as one of a two-phase coolant and a single-phase coolant.

3. The method as claimed in claim 2, wherein the auxiliary energy comprises generating electrical energy for one of:
   1) use in a human compartment of an aircraft;
   2) powering a component of the aircraft; or
   3) augmenting a turbine of the turbine engine.

4. The method as claimed in claim 2, further comprising:
   receiving the coolant in a condenser from the closed cycle turbine, wherein the condenser is positioned within a stream of the compressor bypass air;
   condensing the coolant in the condenser using the compressor bypass air; and
   passing the coolant from the condenser as the liquid into a pump and then the boiler.

5. The method as claimed in claim 2, wherein the closed cycle turbine outputs the auxiliary energy via a shaft to a generator.

6. The method as claimed in claim 2 further comprising receiving the coolant from the closed cycle turbine in a condenser, receiving the compressor bypass air in the condenser from a fan, and condensing a fluid in the condenser by extracting energy from the fluid into the compressor bypass air.

7. The method as claimed in claim 1, wherein the coolant is one of: water, a mixture of water and ammonia, and a mixture of water and another fluid.

8. A method of manufacturing a turbine engine comprising:
   assembling a fan to provide an air flow to the turbine engine as compressor intake air and as compressor bypass air;
   positioning a first stage compressor to receive the compressor intake air and output a first stage compressed air;
   positioning a boiler to cool the first stage compressed air using a fluid;
   positioning a second stage compressor to receive the first stage compressed air from the boiler;
   configuring a pump to pump the fluid as a liquid into the boiler, such that energy is extracted from the first stage compressed air in the boiler, causing the cooling of the first stage compressed air therein;
   positioning a heat exchanger within an exhaust stream of the turbine engine;
   configuring the heat exchanger to receive the fluid from the boiler and heat the fluid with the exhaust stream prior to entering a closed cycle turbine; and
   configuring the closed cycle turbine to receive the fluid from the heat exchanger as one of a single-phase and a two-phase fluid, and extract auxiliary energy therefrom.

9. The method as claimed in claim 8, further comprising configuring a turbine assembly to receive combustion products from a combustor to extract energy for an aircraft.

10. The method of claim 9, further comprising positioning a condenser to receive the fluid from the closed cycle turbine and to receive the compressor bypass air from the fan, in order to condense the fluid by extracting energy from the fluid into the compressor bypass air.

11. The method of claim 8, wherein the fluid includes water or a water and ammonia mixture or a mixture of water and another fluid.

12. The method of claim 8, further comprising positioning a condenser to:
    receive a coolant from the closed cycle turbine, wherein the condenser is positioned within a stream of the compressor bypass air;
    condense the coolant in the condenser using the compressor bypass air; and
    pass the coolant from the condenser as the liquid into the boiler.

13. A turbine engine comprising:
    a fan that provides an air flow to the turbine engine as compressor intake air and as compressor bypass air;
    a first stage compressor positioned to receive the compressor intake air and output a first stage compressed air;
    a boiler positioned to cool the first stage compressed air using a fluid;
    a second stage compressor positioned to receive the cooled first stage compressed air;
    a pump configured to pump the fluid as a liquid into the boiler, such that the fluid in the boiler extracts energy from the first stage compressed air and causes the cooling of the first stage compressed air;
    a closed cycle turbine configured to receive the fluid from the boiler and extract auxiliary energy therefrom; and
    a heat exchanger positioned within an exhaust stream emitted from a turbine assembly, and positioned to receive the fluid from the boiler and heat the fluid with the exhaust stream prior to entering the closed cycle turbine.

14. The turbine engine as claimed in claim 13, further comprising:
    a combustor positioned to receive compressed air from the second stage compressor and output combustion products; and the turbine assembly positioned to receive the combustion products from the combustor and extract thrust energy for an aircraft therefrom.

15. The turbine engine as claimed in claim 14, wherein the auxiliary energy is used for one of:
   1) electrical energy for use within a human compartment of the aircraft;
   2) electrical energy for powering a component of the aircraft;
   3) electrical energy to augment power extracted from the turbine assembly; or
   4) mechanical energy via a gearbox and output shaft directly coupled to a fan shaft or a fan gear box.

16. The turbine engine as claimed in claim 14, wherein the closed cycle turbine receives the fluid as one of a two-phase fluid and a single-phase fluid.

17. The turbine engine as claimed in claim 16, wherein the closed cycle turbine outputs energy via a shaft to a generator.

18. The turbine engine as claimed in claim 14, further comprising a condenser positioned to receive the fluid from the closed cycle turbine, receive the compressor bypass air from the fan, and condense the fluid by extracting energy from the fluid into the compressor bypass air.

19. The turbine engine as claimed in claim 13, wherein the fluid includes water or a water and ammonia mixture or a mixture of water and another fluid.

\* \* \* \* \*